United States Patent
Fukushima

(10) Patent No.: US 7,572,415 B2
(45) Date of Patent: Aug. 11, 2009

(54) CATALYST CONVERTER AND DIESEL PARTICULATE FILTER SYSTEM

(75) Inventor: Koji Fukushima, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 305 days.

(21) Appl. No.: 10/221,788

(22) PCT Filed: Mar. 21, 2001

(86) PCT No.: PCT/JP01/02248

§ 371 (c)(1), (2), (4) Date: Sep. 17, 2002

(87) PCT Pub. No.: WO01/71170

PCT Pub. Date: Sep. 27, 2001

(65) Prior Publication Data

US 2003/0049180 A1 Mar. 13, 2003

(30) Foreign Application Priority Data

Mar. 22, 2000 (JP) .............. 2000-079881
Mar. 22, 2000 (JP) .............. 2000-080376

(51) Int. Cl.
*B01D 51/00* (2006.01)
(52) U.S. Cl. .............. 422/171; 422/177; 422/179; 422/221; 428/331; 428/327
(58) Field of Classification Search .............. 422/171, 422/177, 179, 221
See application file for complete search history.

(56) References Cited

U.S. PATENT DOCUMENTS

| 4,746,570 A | * | 5/1988 | Suzaki et al. ............... 428/327 |
| 5,290,522 A | | 3/1994 | Rogers et al. ............... 422/179 |
| 5,380,580 A | | 1/1995 | Rogers et al. |
| 5,882,608 A | * | 3/1999 | Sanocki et al. ............... 422/179 |

(Continued)

FOREIGN PATENT DOCUMENTS

EP 0 643 204 3/1995

(Continued)

OTHER PUBLICATIONS

U.S. Appl. No. 11/833,804, filed Aug. 3, 2007, Nishikawa.

(Continued)

*Primary Examiner*—Alexa D. Neckel
*Assistant Examiner*—Kaity V. Handal
(74) *Attorney, Agent, or Firm*—Oblon, Spivak, McClelland, Maier & Neustadt, P.C.

(57) ABSTRACT

A holding and sealing material for disposal between a catalyst carrier and a metal shell covering the outer face of the catalyst carrier. The holding and sealing material includes an inorganic fiber mat subjected to needle punching producing needled holes having a density of 50-3,000 per 100 $cm^2$ thereof and an organic filler included inside of the needled holes of the inorganic fiber mat. The holding and sealing mat material generates a surface pressure of 5-500 kPa when heated to 300-1,000° C. under the filling bulk density of 0.15-0.45 $g/cm^3$. The holding and sealing mat material includes an organic component which is over 0 and not more than 2 weight % after being heated to 300-1,000° C.

20 Claims, 5 Drawing Sheets

U.S. PATENT DOCUMENTS

| | | |
|---|---|---|
| 6,960,386 B2 | 11/2005 | Agata |
| 2003/0049180 A1 | 3/2003 | Fukushima |
| 2004/0022699 A1 | 2/2004 | Fukushima |
| 2004/0052694 A1* | 3/2004 | Nishikawa et al. .......... 422/177 |
| 2004/0234428 A1 | 11/2004 | Tanahashi et al. |
| 2006/0278323 A1 | 12/2006 | Eguchi |
| 2007/0207069 A1 | 9/2007 | Kariya |
| 2007/0231222 A1 | 10/2007 | Okabe |
| 2007/0292318 A1 | 12/2007 | Andoh et al. |
| 2008/0044317 A1 | 2/2008 | Kariya |
| 2008/0047638 A1 | 2/2008 | Sugino |

FOREIGN PATENT DOCUMENTS

| | | |
|---|---|---|
| JP | 59-519 | 1/1984 |
| JP | 1-190910 | 8/1989 |
| JP | 7-286514 | 10/1995 |
| JP | 11-173140 | 6/1999 |
| JP | 1999173140 A | 6/1999 |
| JP | 1999343846 A | 12/1999 |
| JP | 2000-34918 | 2/2000 |

OTHER PUBLICATIONS

S-2 Glass Fiber: Enhanded properties for demanding application, Mar. 1990.

High Strength solutions to your toughest reinforcement challenges, Mar. 2004.

Press release regarding the forming of a joint venture between Owens-Corning and Porcher. Submitted as evidence by 3M as part of the Notice of Opposition filed Apr. 18, 2007.

Measurement of amount of organic sizing in Nextel 550 fibers, Submitted as evidence by 3M as part of the Notice of Opposition filed Apr. 18, 2007.

* cited by examiner

CATALYST CONVERTER AND DIESEL PARTICULATE FILTER SYSTEM

TECHNICAL FIELD

The present invention relates to an exhaust gas purifying device and more particularly, relates to a holding and sealing mat material for holding a catalyst carrier in the catalytic converter and a holding and sealing mat material for holding a diesel particulate filter in a diesel particulate filter system.

BACKGROUND ART

The exhaust system of automobile engine is provided with an exhaust gas purifying device for purifying exhaust gas components. As the exhaust gas purifying device, a catalytic converter, a diesel particulate filter (hereinafter referred to as DP filter) system and the like are available.

The catalytic converter purifies exhaust gas components (carbon hydride, carbon monoxide, nitric oxide and the like) emitted from a gasoline engine or a diesel engine. The catalytic converter comprises a ceramic-made catalyst carrier carrying catalyst for purifying exhaust gas components and a metallic shell for accommodating it. A holding and sealing mat material for holding the catalyst carrier is disposed between the catalyst carrier and the metallic shell. The catalyst carrier is mounted in the metallic shell in a condition that the holding and sealing mat material is wound around it. Because the thermal expansion coefficient is different between the metallic shell and the ceramic-made catalyst carrier, a difference in thermal expansion between the two occurs under high temperatures. Thus, development of the holding and sealing mat material having cushioning performance capable of absorbing the difference in thermal expansion has been demanded.

The DP filter system purifies exhaust gas by catching diesel particulates emitted from a diesel engine. The DP filter system comprises a ceramic-made DP filter for catching diesel particulates and a metallic shell for accommodating the ceramic-made DP filter. A holding and sealing mat material for holding the DP filter is disposed between the DP filter and the metallic shell. The DP filter is mounted in the metallic shell in a condition that the holding and sealing mat material is wound around it. Because the thermal expansion coefficient is different between the metallic shell and the ceramic-made DP filter, a difference in thermal expansion between the two occurs under high temperatures. Thus, as is the case with the catalytic converter, development of the holding and sealing mat material having a cushioning performance capable of absorbing the difference in thermal expansion has been demanded.

Both the holding and sealing mat material of the catalyst carrier and the holding and sealing mat material of the DP filter have cushioning performances and large volumes. Thus, it is difficult to mount the catalyst carrier or the DP filter in the metallic shell, which the holding and sealing mat material is wound around.

In views of such conventional problems, an object of the invention is to provide a catalytic converter containing the holding and sealing mat material which facilitates work for mounting the catalyst carrier into the metallic shell and has an excellent cushioning performance and further, a diesel particulate filter system containing the holding and sealing mat material which facilitates work for mounting the DP filter into the metallic shell and has an excellent cushioning performance.

DISCLOSURE OF THE INVENTION

According to a first aspect of the invention, there is provided a catalytic converter comprising a catalyst carrier, a metallic shell covering the outer face of the catalyst carrier, and a holding and sealing mat material disposed between the catalyst carrier and the metallic shell, wherein the holding and sealing mat material comprises inorganic fiber mat subjected to needle punching in the density of 50-3,000 per 100 cm$^2$ thereof, and organic component which is largely over 0 and not more than 2 weight %; and wherein the holding and sealing mat material generates a surface pressure of 5-500 kPa when heated to 300-1,000° C. under the filling bulk density of 0.15-0.45 g/cm$^3$.

According to the first aspect of the invention, the content of organic component in the holding and sealing mat material is over 0 and not more than 2 weight %. The organic component acts as a binder for the holding and sealing mat material so as to suppress scattering of fibers from the holding and sealing mat material. Additionally, the volume of the holding and sealing mat material is suppressed to some extent. Therefore, the difficulty in mounting the holding and sealing mat material in the metallic shell together with the catalyst carrier is improved.

On the other hand, if the content of organic component in the holding and sealing mat material exceeds 2 weight %, a process for baking after mounting the holding and sealing mat material in the metallic shell is required in order to burn out the organic component and reduce the amount of exhaust gas component, so that the manufacturing process becomes complicated.

If the content of organic component in the holding and sealing mat material is 0, that is if no organic component is contained, fibers are scattered from the holding and sealing mat material. Thus, it becomes difficult to mount the holding and sealing mat material in the metallic shell together with the catalyst carrier.

Because the inorganic fiber mat is subjected to needle punching, entangling between fibers is intensified to increase stiffness. Thus, a force of the holding and sealing mat material for holding the catalyst carrier is high. Further, the volume of the holding and sealing mat material is suppressed and the difficulty in mounting the holding and sealing mat material in the metallic shell together with the catalyst carrier is improved.

Thus, the first aspect of the present invention can provide a catalytic converter containing the holding and sealing mat material which facilitates work for mounting the catalyst carrier into the metallic shell and has an excellent cushioning performance.

According to a second aspect of the present invention, there is provided a diesel particulate filter system comprising a diesel particulate filter, a metallic shell covering the outer face of the diesel particulate filter, and a holding and sealing mat material disposed between the diesel particulate filter and the metallic shell, wherein the holding and sealing mat material comprises inorganic fiber mat subjected to needle punching in the density of 50-3,000 per 100 cm$^2$ thereof, and organic component which is largely over 0 and not more than 2 weight %; and wherein the holding and sealing mat material generates a surface pressure of 5-1,000 kPa when heated to 300-500° C. under the filling bulk density of 0.15-0.55 g/cm$^3$.

In the second aspect of the invention, the content of organic component in the holding and sealing mat material is over 0 and not more than 2 weight %. The organic component acts as a binder for the holding and sealing mat material so as to suppress the volume of the holding and sealing mat material to some extent. Therefore, the difficulty in mounting the holding and sealing mat material in the metallic shell together with the DP filter is improved.

Moreover, by specifying the content of the organic component within the above amount, the scattering of fibers from the holding and sealing mat material can be prevented.

On the other hand, if the content of organic component in the holding and sealing mat material exceeds 2 weight %, a process for baking after mounting the holding and sealing mat material in metallic shell is required in order to burn out organic component and reduce the amount of exhaust gas, so that the manufacturing process becomes complicated.

If the content of organic component in the holding and sealing mat material is 0, that is if no organic component is contained, fibers are scattered from the holding and sealing mat material. Thus, working environment when mounting the holding and sealing mat material in the metallic shell together with the DP filter is worsened.

Because the inorganic fiber mat is subjected to needle punching, entangling between fibers is intensified to increase stiffness. Thus, a force of the holding and sealing mat material for holding the DP filter is high. Further, the volume of the holding and sealing mat material is suppressed and the difficulty in mounting the holding and sealing mat material in the metallic shell together with the DP filter is improved.

Thus, the second aspect of the present invention can provide a diesel particulate filter system containing the holding and sealing mat material which facilitates work for mounting the DP filter into the metallic shell and has an excellent cushioning performance.

BEST MODE FOR CARRYING OUT THE INVENTION

Figure 1:
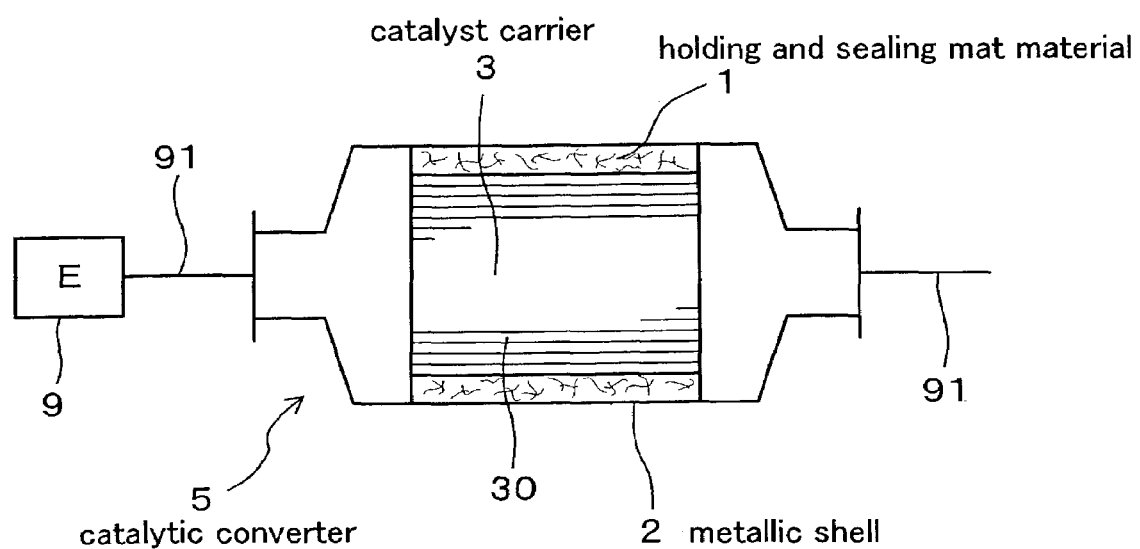
FIG. 1 is a sectional view of a catalytic converter of a first example.

According to the first aspect of the present invention, the content of organic component in the aforementioned holding and sealing mat material is preferred to exceed 0 largely and be not more than 1 weight %. If the content exceeds 1 weight %, a process for burning after mounting the holding and sealing mat material in a metallic shell may be required in order to burn out organic component and clear governmental exhaust gas restriction value.

As the organic component contained in the holding and sealing mat material, there is no special restriction as long as it has a function as a binder, and emulsion latex can be cited.

As a method for adding the organic component to inorganic fiber mat, dipping method, spraying method, roll coating method and the like are available.

The holding and sealing mat material is preferred to comprise inorganic fiber containing at least alumina or silica. Consequently, its heat resistance is improved.

The aforementioned holding and sealing mat material is preferred to contain alumina of 70 weight % or more. As a result, its heat resistance is improved. Further, its elasticity under high temperatures is raised, and therefore the holding and sealing mat material can absorb a difference in thermal expansion between a metallic shell and a catalyst carrier, so that a force for holding the catalyst carrier is raised. Consequently, the catalyst carrier is prevented from shaking so as to suppress increase of vibrating noise. Further, these characteristics can be exerted sufficiently under high temperatures of 950-1,000° C., thereby corresponding sufficiently to the trend of raised temperature in an internal combustion engine in recent years.

The needle punching to the inorganic fiber mat is executed so that needle traces of 50-3,000 are formed in an area of 100 $cm^2$ of the inorganic fiber mat. If the quantity is less than 50, the volume of the holding and sealing mat material is so large that, it may not be mounted in the metallic shell together with the catalyst carrier. If the quantity exceeds 3,000, the performance of the holding and sealing mat material to hold the catalyst carrier degrades, so that the catalyst carrier may be slipped.

According to the first aspect of the present invention, the filling bulk density of the holding and sealing mat material in the metallic shell is preferably 0.15-0.45 $g/cm^3$. If it is less than 0.15 $g/cm^3$, a force for holding the catalyst carrier may drop. If it exceeds 0.45 $g/cm^3$, there is an apprehension that the catalyst carrier may be destroyed.

The holding and sealing mat material filled in the metallic shell generates a surface pressure of 5-500 kPa when heated to 300-1,000° C. under the filling bulk density of 0.15-0.45 $g/cm^3$. As a result, the force for holding the catalyst carrier is increased, so that the catalyst carrier can be held stably without any shake. If it is less than 5 kPa, the force for holding the catalyst carrier may drop. If it exceeds 500 kPa, the catalyst carrier may be destroyed.

The reason why the temperature for measuring the surface pressure is 300-1,000° C. is that the catalyst carrier is exposed to this temperature when actually mounted on a vehicle.

According to the first invention, the metallic shell is preferred to have press-in type structure. The press-in type structure refers to a type in which the catalyst carrier covered with the holding and sealing mat material is pressed into the metallic shell with a pressure when the catalyst carrier is disposed in the metallic shell. The specific configuration of the metallic shell is, for example, a cylinder. The above-described press-in type structure can prevent the catalyst carrier from shaking after mounted.

The metallic shell is preferred to have clamshell structure. The clamshell structure is comprised of, for example, two-separate shell members and the catalyst carrier covered with the holding and sealing mat material is mounted therein and after that, a joint of the shell members is joined together by welding or using adhesive. Such a structure facilitates mounting of the catalyst carrier in the metallic shell.

The metallic shell is preferred to have winding type structure. The winding type structure refers to a type in which a catalyst carrier covered with the holding and sealing mat material is prepared and then metallic thin plate is wound around the catalyst carrier so as to form a metallic shell. Such a structure enables the catalyst carrier to be mounted in the metallic shell easily regardless of the configuration of the catalyst carrier.

According to the second aspect of the present invention, the content of organic component in the aforementioned holding and sealing mat material is preferred to exceed 0 largely and be not more than 1 weight %. If the content exceeds 1 weight %, a process for burning after mounting the holding and sealing mat material in a metallic shell may be required in order to burn out organic component and clear governmental exhaust gas restriction value.

As the organic component contained in the holding and sealing mat material, there is no special restriction as long as it has a function as a binder, and emulsion latex, polyvinyl alcohol and the like can be cited.

As a method for adding the organic component to inorganic fiber mat, dipping method, spraying method, roll coating method and the like are available.

The inorganic fiber mat is preferred to comprise inorganic fiber containing at least alumina or silica. Consequently, its heat resistance is improved.

The aforementioned holding and sealing mat material is preferred to contain alumina of 70 weight % or more. As a result, its heat resistance is improved. Further, its elasticity under high temperatures is raised and therefore the holding and sealing mat material can absorb a difference in thermal expansion between a metallic shell and a DP filter, so that a force for holding the DP filter is increased. Consequently, the DP filter is prevented from shaking so as to suppress increase of vibrating noise. Further, these characteristics can be exerted sufficiently under high temperatures as high as 500° C., thereby corresponding sufficiently to the trend of raised temperature in an internal combustion engine in recent years.

The needle punching to the inorganic fiber mat is executed so that needle traces of 50-3,000 are found in an area of 100 $cm^2$ of the inorganic fiber mat. If the quantity is less than 50, the volume of the holding and sealing mat material is so large that it may not be mounted in the metallic shell together with catalyst carrier. If the quantity exceeds 3,000, the performance of the holding and sealing mat material to hold the catalyst carrier degrades, so that the catalyst carrier may be slipped.

The filling bulk density of the holding and sealing mat material in the metallic shell is preferably 0.15-0.55 $g/cm^3$. If it is less than 0.15 $g/cm^3$, a force for holding the DP filter may drop. If it exceeds 0.55 $g/cm^3$, there is an apprehension that the DP filter may be destroyed.

The holding and sealing mat material filled in the metallic shell generates a surface pressure of 5-1000 kPa when heated to 300-500° C. under the filling bulk density of 0.15-0.55 $g/cm^3$. As a result, the force for holding the DP filter is increased, so that the DP filter can be held stably without any shake. If it is less than 5 kPa, the force for holding the DP filter may drop. If it exceeds 1000 kPa, the DP filter may be destroyed. The reason why the temperature for measuring the surface pressure is 300-500° C. is that the DP filter is exposed to this temperature when actually mounted on a vehicle.

The metallic shell is preferred to have press-in type structure. The press-in type structure refers to a type in which the DP filter covered with the holding and sealing mat material is pressed into the metallic shell with a pressure when the DP filter is disposed in the metallic shell. The specific configuration of the metallic shell is, for example, a cylinder.

The above-described press-in type structure can prevent the catalyst carrier from shaking after mounted.

The metallic shell is preferred to have clamshell structure. The clamshell structure is comprised of two-separate shell members and the catalyst carrier covered with the holding and sealing mat material is mounted therein, and after that, a joint of the shell members is joined together by welding or using adhesive. Such a structure facilitates mounting of the catalyst carrier into the metallic shell.

The metallic shell is preferred to have winding type structure. The winding type structure refers to a type in which a DP filter covered with the holding and sealing mat material is prepared and then metallic thin plate is wound around that DP filter so as to form a metallic shell. Such a structure enables the DP filter to be mounted in the metallic shell easily regardless of the configuration of the catalyst carrier.

Hereinafter, the first and second aspects of the present invention will be described with specific examples in detail, however, the first and second aspects are not restricted to examples shown here.

EXAMPLE 1

The catalytic converter according to the first aspect will be described with reference to FIGS. 1-4.

As shown in FIG. 1, the catalytic converter 5 of this example comprises a catalyst carrier 3 which carries catalyst for purifying exhaust gas component, a metallic shell 2 which covers the side face of the catalyst carrier 3 and a holding and sealing mat material 1 which is disposed between the catalyst carrier 3 and the metallic shell 2 and is composed of inorganic fiber mat. The content of organic component in the holding and sealing mat material 1 is 0-8 weight %. The inorganic fiber mat constituting the holding and sealing mat material 1 is composed of alumina of 70 weight % and silica of 30 weight %, and is subjected to needle punching. The filling bulk density of the holding and sealing mat material 1 in the metallic shell 2 is 0.35 $g/cm^3$.

Figure 2:
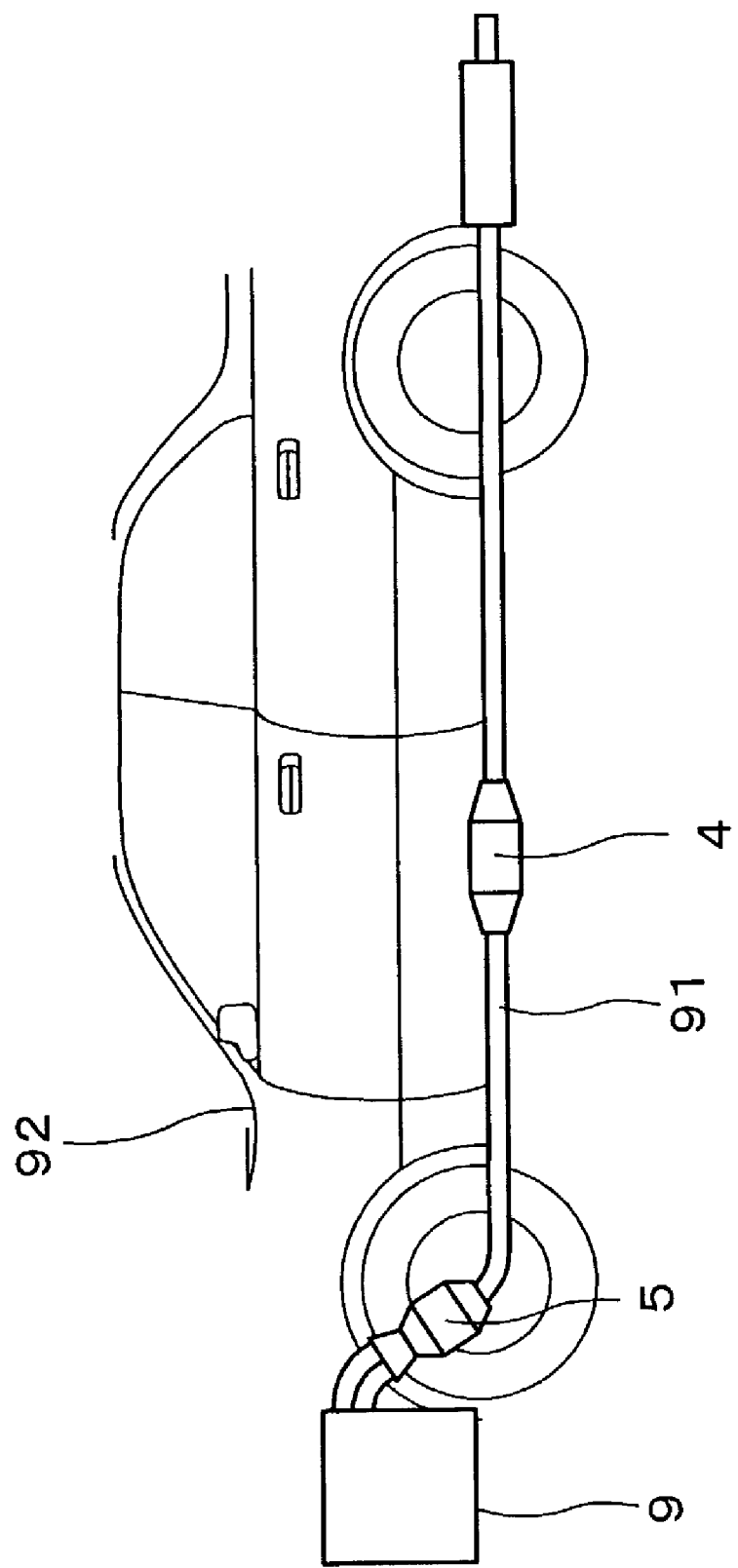
FIG. 2 is an explanatory diagram showing the installation positions of the catalytic converter of the first example and a DP filter system of a fourth example.

As shown in FIG. 2, the catalyst converter 5 is provided halfway of an exhaust gas pipe 91 of an engine 9 at the bottom of a vehicle body 92.

The catalyst carrier is made of cordierite, which is a kind of ceramic. As shown in FIG. 1, the catalyst carrier 3 has honeycomb structure constituted of collection of multiple open cells 30 which are open on the sides of their upstream and downstream of the exhaust gas pipe 91. The wall of the open cell 30 has a plurality of micro openings, which catalyst for purifying exhaust gas component (for example, platinum, rhodium and the like) adheres to. Therefore, when the exhaust gas passes through the open cell 30, exhaust gas component contained in exhaust gas is purified by the action of catalyst carried by the cell wall.

Next, the manufacturing method of the catalytic converter of this example will be described.

Figure 3:
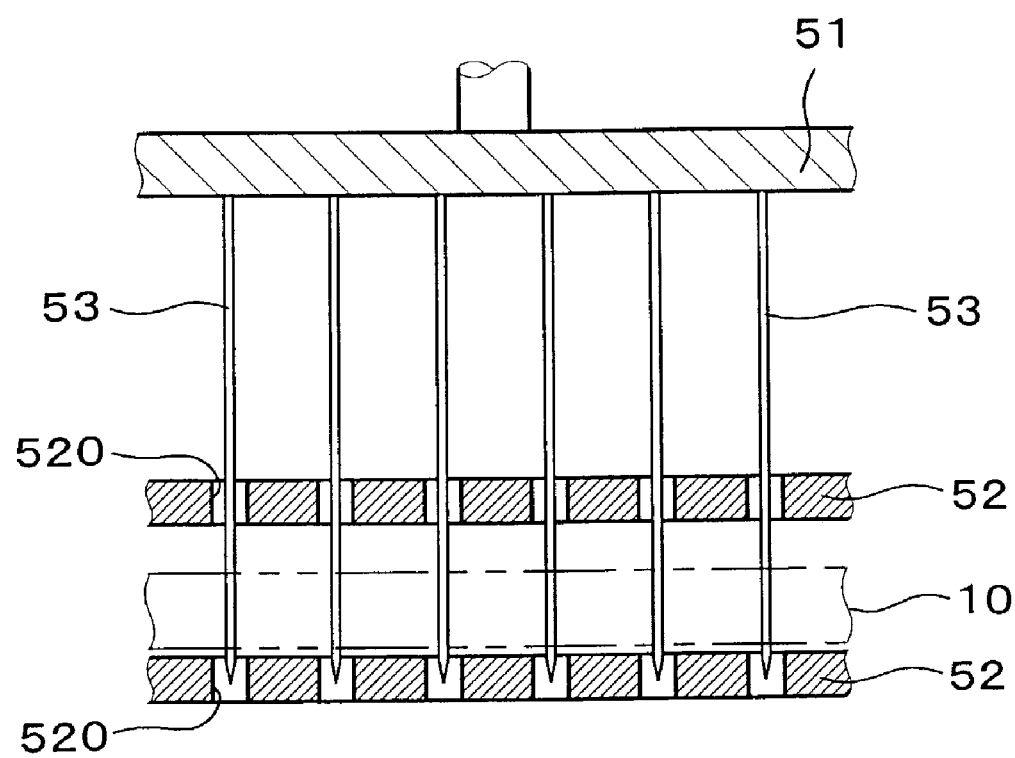
FIG. 3 is an explanatory diagram of a needle punching machine of the first example.

The inorganic fiber is composed of alumina of 70 weight % and silica of 30 weight % so as to form web. The web is subjected to needle punching with a needle-punching machine. As shown in FIG. 3, the needle-punching machine has a needle board 51 capable of reciprocating in the direction of piercing and a pair of support plates 52, which supports both the front and rear faces of the web 10.

The needle board 51 has a plurality of needles 53 fixed thereto so as to pierce the web 10. The needles 53 are fixed in density that about 500 needles 53 exist in an area of 100 $cm^2$ of the needle board. The support boards 52 have through holes 520 for the needles. If the web 10 is passed between a pair of the support plates 52 and the needle board 51 is reciprocated, the needles 53 are pierced into the web 10 so as to form entanglement between fibers in the web 10. Consequently, the inorganic fiber mat is formed such that 500 needle traces exist in an area of 100 $cm^2$.

Next, organic component is allowed to soak into the inorganic fiber mat according to the dipping method. The soaking amount of organic component in the inorganic fiber mat is 1.5 weight %. Emulsion latex is employed as an organic component. As a result, the holding and sealing mat material is obtained.

Figure 4A:
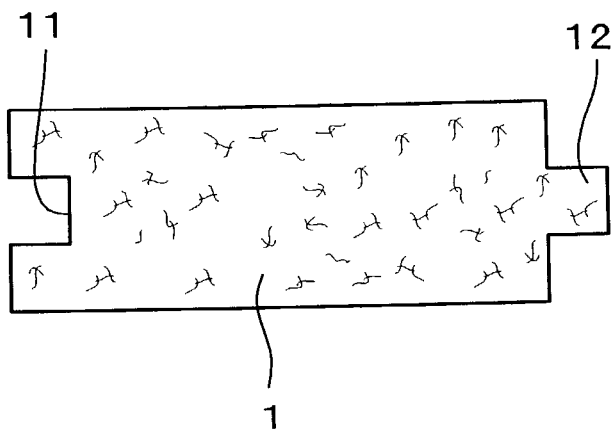
FIG. 4(a)-(c) are explanatory diagrams showing the manufacturing method of the catalytic converter of the first example.

As shown in FIG. 4(a), the holding and sealing mat material 1 is cut out so as to obtain a long body, and then a concave portion 11 and a convex portion 12, which engage with each other when it is wound around an outer peripheral face of the catalyst carrier 3, are formed on both ends thereof.

Figure 4B:
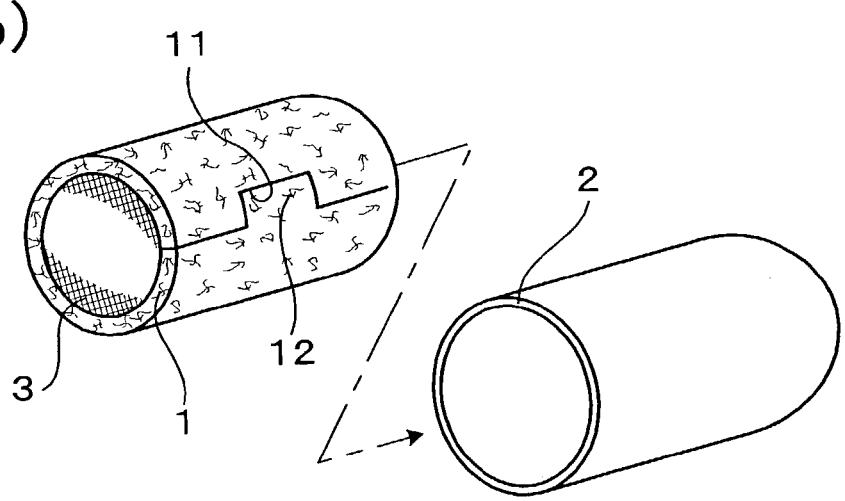

Next, as shown in FIG. 4(b), the holding and sealing mat material 1 is wound around the catalyst carrier 3 and the concave portion 11 and the convex portion 12 are engaged with each other.

Next, the catalyst carrier 3, which the holding and sealing mat material 1 is wound around, is mounted in the cylindrical metallic shell 2.

Figure 4C:
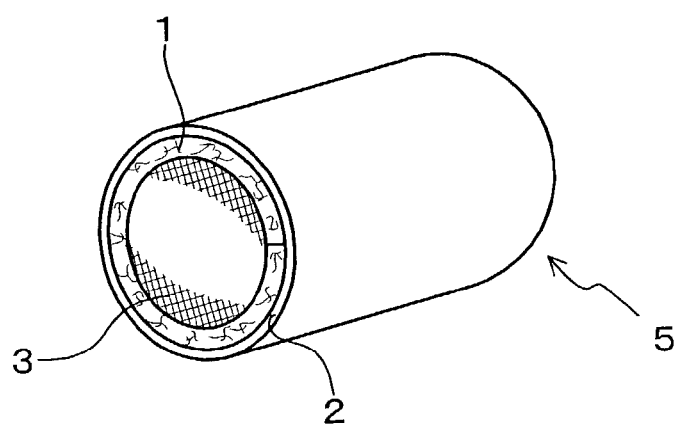

Consequently, as shown in FIG. 4(c), the catalytic converter 5 of this example is obtained.

To measure the surface pressure of the holding and sealing mat material, the temperature was raised to 1,000° C. for 30 minutes and a temperature of 1000° C. was maintained for 10 minutes. When maintaining that temperature for 10 minutes, the temperature of the holding and sealing mat material was kept at 1,000° C. The thermal expansion of a measuring jig was measured previously and was corrected, and then, load (compressive load) after the temperature had been maintained for 10 minutes was measured. The sample size of the holding and sealing mat material was 25 mm×25 mm.

As a result of measurement based on such a method, the surface pressure of the holding and sealing mat material was 110 kPa.

Next, the catalytic converter was actually carried on a vehicle and running test was executed. As a result, the catalyst carrier was not shaken by vibration upon running so that it was held stably. Little vibration noise was generated from the catalytic converter, as an exhaust gas purifying device.

This indicates that the holding and sealing mat material can exert a force for holding the catalyst carrier under high temperatures.

In this example, a small amount of organic component is contained in the holding and sealing mat material. The organic component works as a binder of the holding and sealing mat material so as to suppress the volume of the holding and sealing mat material to some extent. Consequently the catalyst carrier which the holding and sealing mat material is wound around can be mounted easily into the metallic shell.

Because the amount of the organic component in the holding and sealing mat material is small as described above, combustion gas generated upon heating never make the exhaust gas component amount worse.

EXAMPLE 2

In the catalytic converter of this example of the first aspect, a honeycomb type monolith body made of cordierite having an outside diameter of 130 mm and length of 100 mm, is employed as the catalyst carrier. This catalyst carrier has a plurality of square holes along the axial direction of the catalyst carrier and a porous partition wall carrying such catalytic component such as platinum is disposed between the respective holes.

The metallic shell is made of SUS304 and has a clamshell structure.

To manufacture the catalytic converter of this example, the holding and sealing mat material was wound around the surface of the catalyst carrier as the example 1, and then this was mounted in two-separate shell members. The shell members were closed and welded together so as to form a cylindrical metallic shell.

The other points are the same as the example 1. In this example, the same effects as the example 1 can be obtained.

EXAMPLE 3

In the catalytic converter of this example of the first aspect, the metallic shell has the winding type structure.

After the holding and sealing mat material was wound around the surface of the catalyst carrier, a thin metallic sheet having a thickness of 1.5 mm, width of 141 mm and length of 120 mm, was wound around the surface several times.

The other points are the same as the example 1. In this example, the same effects as the example 1 can be obtained.

EXPERIMENTAL EXAMPLE 1

In this example of the first aspect, the surface pressure of the holding and sealing mat material, ease of mounting, and absence/presence of crack in the catalyst carrier and slippage of the catalyst carrier were measured changing the content amount of the organic component in the holding and sealing mat material, density of the needle traces, and filling bulk density of inorganic fiber mat, moreover execute exhaust gas test was executed. Table 1 shows these results.

To measure the surface pressure of the holding and sealing mat material, the surface pressure measuring method used in the example 1 was employed.

In crack evaluation of the catalyst carrier, X is indicated in case of that crack occurred and ○ is indicated in case of that no crack occurred.

In slippage evaluation of the catalyst carrier, X is indicated in case of that slippage occurred and ○ is indicated in case of that no slippage occurred.

In the exhaust gas test, absence or presence of abnormality of exhaust gas control based on an oxygen sensor disposed in the upstream and downstream of the catalytic converter is evaluated. If a great deal of organic component is contained in inorganic fiber mat, abnormality occurs in exhaust gas control so that harmful gas is discharged. Therefore, X is indicated in case of that abnormality occurred in exhaust gas control and ○ is indicated in case of that no abnormality occurred.

As a result of measurement, as evident from Table 1, in case of that organic component of 0.1-2 weight % was contained in inorganic fiber mat, the needle punching was achieved in the density of 50-3,000 per 100 $cm^2$ of the inorganic fiber mat and the filling bulk density is 0.15-0.45 $g/cm^3$, it was found that the ease of mounting was excellent and exhaust gas originated from the holding and sealing mat material was not generated.

On the other hand, although not shown in the Table, in case of that organic component is 0, fibers were scattered from the holding and sealing mat material, thereby changing the ease of mounting for the worse.

TABLE 1

| | | catalyst carrier | | evaluating result | | | | | | | |
|---|---|---|---|---|---|---|---|---|---|---|---|
| | content amount of the organic component | density of needle traces | filling bulk density | surface pressure (kPa) heating temperature | | | | catalyst carrier | | | exhaust gas test |
| Sample | (wt %) | (g/100 cm²) | (g/cm³) | 300° C. | 500° C. | 800° C. | 1000° C. | ease of mounting | slippage | crack | |
| Example | 2 | 50 | 0.15 | 26 | 25 | 23 | 22 | ○ | ○ | ○ | ○ |
| | ↑ | ↑ | 0.45 | 488 | 475 | 471 | 466 | ○ | ○ | ○ | ○ |
| | ↑ | 3000 | 0.15 | 7.8 | 7.6 | 6.9 | 6.6 | ○ | ○ | ○ | ○ |
| | ↑ | ↑ | 0.45 | 283 | 274 | 270 | 266 | ○ | ○ | ○ | ○ |
| | 0.1 | 50 | 0.15 | 30 | 28 | 23 | 22 | ○ | ○ | ○ | ○ |
| | ↑ | ↑ | 0.45 | 492 | 278 | 471 | 466 | ○ | ○ | ○ | ○ |
| | ↑ | 3000 | 0.15 | 8.9 | 8.1 | 6.9 | 6.6 | ○ | ○ | ○ | ○ |
| | ↑ | ↑ | 0.45 | 296 | 280 | 270 | 266 | ○ | ○ | ○ | ○ |
| Comparative example | 3 | 40 | 0.15 | 3.7 | 3.5 | 3.3 | 3.2 | ○ | ○ | ○ | X |
| | ↑ | ↑ | 0.45 | 613 | 602 | 597 | 596 | X | X | ○ | X |
| | ↑ | 4000 | 0.15 | 3.5 | 3.2 | 3 | 2.8 | ○ | ○ | X | X |
| | ↑ | ↑ | 0.45 | 252 | 248 | 245 | 242 | ○ | ○ | ○ | X |

EXAMPLE 4

The DP filter system of this example of the second aspect will be described with reference to FIG. 5.

Figure 5:
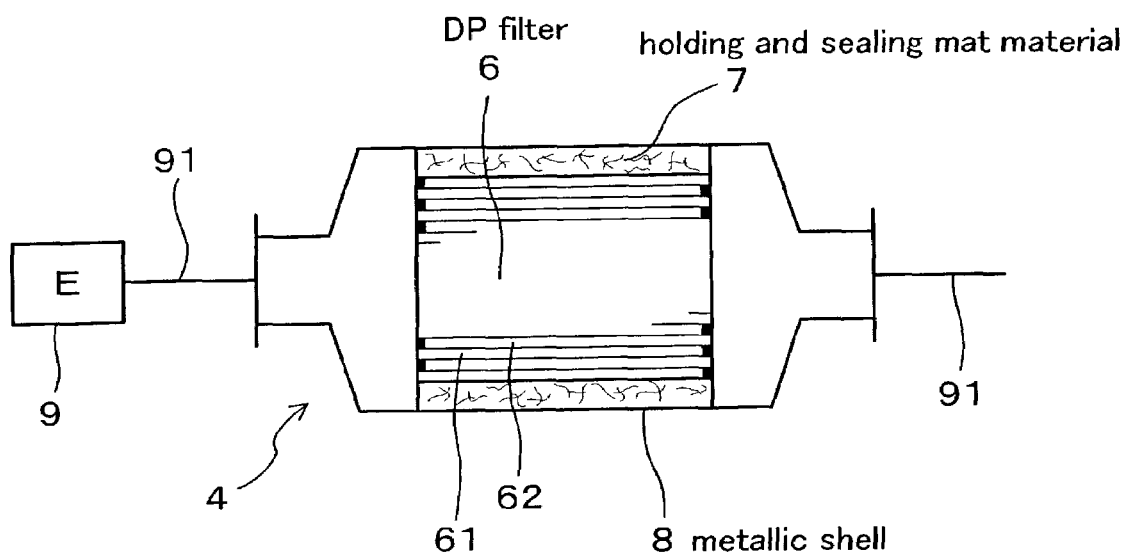
FIG. 5 is a sectional view of the DP filter system of the fourth example.

The DP filter system 4 of this example comprises, as shown in FIG. 5, a DP filter 6 for catching diesel particulates, a metallic shell 8 covering the side face of the DP filter 6, and a holding and sealing mat material 7 which is disposed between the DP filter 6 and the metallic shell 8 and made of inorganic fiber mat.

The content of organic component in the holding and sealing mat material 7 is 1 weight %. The inorganic fiber mat, which constitutes the holding and sealing mat material 7, is composed of alumina of 70 weight % and silica of 30 weight % and is subjected to the needle punching. The filling bulk density of the holding and sealing mat material 7 in the metallic shell 8 is 0.35 g/cm3.

As shown in FIG. 2, the DP filter system 4 is provided halfway of an exhaust pipe 91 of a diesel engine 9 at the bottom of a vehicle body 92.

The DP filter is made of cordierite, which is a kind of ceramic. As shown in FIG. 5, the DP filter 6 has honeycomb structure constituted of a plurality of collections of cells which are open on the one side of their upstream or downstream of the exhaust gas pipe 91 while the other one is closed. The DP filter 6 allows exhaust gas to pass through porous cell wall from an upstream side open cell 61 to a downstream side open cell 62. At this time, diesel particulate contained in exhaust gas is caught by the cell wall so that exhaust gas is purified.

The caught diesel particulate is burnt out by an ignition device (not shown in the Figure).

Next, manufacturing method of the DP filter system of this example will be described.

First, a holding and sealing mat material is produced according to the same method and under the same condition as the example 1. However, the content of organic component in inorganic fiber mat is 1 weight %.

Next, the holding and sealing mat material 7 is cut out to a predetermined shape according to the method shown in FIG. 4 as the example 1. The DP filter 6, which the holding and sealing mat material 7 is wound around, is mounted in the cylindrical metallic shell 8. Consequently, the DP filter system 4 of this example is obtained as shown in FIG. 5.

To measure the surface pressure of the holding and sealing mat material, the temperature was raised to 500° C. for 30 minutes and maintained at 500° C. for 10 minutes. When it was maintained for 10 minutes, the temperature of the holding and sealing mat material was kept at 500° C. The thermal expansion of the measuring jig was measured previously and was corrected, and then load (compressive load) after the temperature had been kept for 10 minutes was measured. The sample size of the holding and sealing mat material was 25 mm×25 mm.

As a result of measurement in such a method, the surface pressure of the holding and sealing mat material was 180 kPa.

The filling bulk density of the holding and sealing mat material in the metallic shell was 0.35 g/cm³ and the thickness thereof was 6 mm.

The running test of the DP filter system mounting the DP filter and the holding and sealing mat material was carried out in the same method as the example 1. As a result, the DP filter was not shaken by vibration upon running, so that it was held stably. Little vibration noise was generated from the DP filter system, which was an exhaust gas purifying device.

From this, it is evident that the holding and sealing mat material is capable of exerting force for holding the DP filter under high temperatures.

In this example, a small amount of organic component is contained in the holding and sealing mat material. The organic component acts as a binder of the holding and sealing mat material so as to suppress the volume of the holding and sealing mat material to some extent. Consequently, the DP filter which the holding and sealing mat material is wound around can be mounted easily into the metallic shell.

Further, because the amount of the organic component in the holding and sealing mat material is small as described above, cushioning performance of the holding and sealing mat material can be maintained and its performance for holding the DP filter is excellent.

EXPERIMENTAL EXAMPLE 2

In this example of the second aspect, the surface pressure of the holding and sealing mat material, ease of mounting, and absence/presence of crack in the DP filter and slippage of the DP filter were measured changing the content amount of organic component in the holding and sealing mat material, density of the needle traces, and filling bulk density of inorganic fiber mat, moreover exhaust gas test was executed. The method described in the example 4 was employed to measure the surface pressure of the holding and sealing mat material. The other measurements were executed in the same manner as experimental example 1. Table 2 shows these results.

As a result of measurement, as evident from Table 2, in case of that organic component of 0.1-2 weight % was contained in inorganic fiber mat, the needle punching was achieved in the density of 50-3,000 per 100 cm$^2$ of the inorganic fiber mat and the filling bulk density is 0.15-0.55 g/cm$^3$, particularly 0.15-0.45 g/cm$^3$, it was found that the ease of mounting was excellent and exhaust gas originated from the holding and sealing mat material was not generated.

On the other hand, although not shown in the Table 2,

TABLE 2

| | DP filter | | | evaluating result | | | | | |
|---|---|---|---|---|---|---|---|---|---|
| | content amount of the organic component | density of needle traces | filling bulk density | surface pressure (kPa) heating temperature | | DP filter | | | |
| Sample | (wt %) | (g/100 cm$^2$) | (g/cm$^3$) | 300° C. | 500° C. | ease of mounting | slippage | crack | exhaust gas test |
| 1 | 2 | 50 | 0.15 | 26 | 25 | ○ | ○ | ○ | ○ |
| 2 | ↑ | ↑ | 0.5 | 518 | 515 | ○ | ○ | ○ | ○ |
| 3 | ↑ | 3000 | 0.15 | 7.8 | 7.6 | ○ | ○ | ○ | ○ |
| 4 | ↑ | ↑ | 0.45 | 283 | 274 | ○ | ○ | ○ | ○ |
| 5 | 0.1 | 50 | 0.15 | 30 | 28 | ○ | ○ | ○ | ○ |
| 6 | ↑ | ↑ | 0.45 | 492 | 278 | ○ | ○ | ○ | ○ |
| 7 | ↑ | 3000 | 0.15 | 8.9 | 8.1 | ○ | ○ | ○ | ○ |
| 8 | ↑ | ↑ | 0.45 | 296 | 280 | ○ | ○ | ○ | ○ |
| 9 | 3 | 40 | 0.12 | 3.7 | 3.5 | ○ | ○ | X | X |
| 10 | ↑ | ↑ | 0.6 | 1013 | 1011 | X | X | ○ | X |
| 11 | ↑ | 4000 | 0.15 | 3.5 | 3.2 | ○ | ○ | X | X |
| 12 | ↑ | ↑ | 0.45 | 252 | 248 | ○ | ○ | ○ | X |

INDUSTRIAL APPLICABLITY

As described above, the present invention provides a catalytic converter containing the holding and sealing mat material which facilitates work for mounting the catalyst carrier into the metallic shell and has an excellent cushioning performance and further, a diesel particulate filter system containing the holding and sealing mat material which facilitates work for mounting the DP filter into the metallic shell and has an excellent cushioning performance.

The invention claimed is:

1. A holding and sealing material for disposal between a catalyst carrier and a metal shell covering the outer face of the catalyst carrier, the holding and sealing material comprising:
   an inorganic fiber mat subjected to needle punching producing needled holes having a density of 50-3,000 per 100 cm$^2$ thereof;
   an organic component included inside of the needled holes of the inorganic fiber mat,
   wherein the holding and sealing mat material generates a surface pressure of 5-500 kPa when heated to 300-1,000° C. under the filling bulk density of 0.15-0.45 g/cm$^3$, wherein said organic component is over 0 and not more than 2 weight % after being heated to 300-1,000° C.

2. A catalytic converter as claimed in claim 1, wherein the inorganic fiber mat comprises inorganic fiber containing at least alumina or silica.

3. A catalytic converter as claimed in claim 1, wherein the metallic shell has press-in structure.

4. A catalytic converter as claimed in claim 1, wherein the metallic shell has clamshell structure.

5. A catalytic converter as claimed in claim 1, wherein the metallic shell has winding type structure.

6. A diesel particulate filter system comprising:
   a holding and sealing material which is to be disposed between a diesel particulate filter and a metal shell covering the outer face of the diesel particulate filter,
   wherein the holding and sealing material has a filling bulk density 0.15-0.45 g/cm$^3$,
   wherein the holding and sealing mat material comprises an inorganic fiber mat subjected to needle punching producing needled holes having a density of 50-3,000 per 100 cm$^2$ thereof;
   an organic component included inside of the needled holes of the inorganic fiber mat,
   wherein the holding and sealing mat material generates a surface pressure of 5-500 kPa when heated to 300-1000° C. under the filling bulk density of 0.15-0.45 g/cm$^3$, wherein said organic component is over 0 and not more than 2 weight % after being heated to 300-1,000° C.

7. A diesel particulate filter system as claimed in claim 6, wherein the inorganic fiber mat comprises inorganic fiber containing at least alumina or silica.

8. A diesel particulate filter system as claimed in claim 6, wherein the metallic shell has press-in type structure.

9. A diesel particulate filter system as claimed in claim 6, wherein the metallic shell has clamshell structure.

10. A diesel particulate filter system as claimed in claim 6, wherein the metallic shell has winding type structure.

11. A catalytic converter as claimed in claim 2, wherein the metallic shell has press-in structure.

12. A catalytic converter as claimed in claim 2, wherein the metallic shell has clamshell structure.

13. A catalytic converter as claimed in claim 2, wherein the metallic shell has winding type structure.

14. A diesel particulate filter system as claimed in claim 7, wherein the metallic shell has press-in type structure.

15. A diesel particulate filter as claimed in claim 7, wherein the metallic shell has clamshell structure.

16. A diesel particulate filter system as claimed in claim 7, wherein the metallic shell has winding type structure.

17. A holding and sealing mat configured to be disposed between a catalyst carrier and metallic shell covering the outer face of the catalyst carrier, or between a diesel particulate filter and a metallic shell covering the outer face of the diesel particulate filter, the holding and sealing mat material comprising:

an inorganic fiber mat subjected to needle punching producing needle hole having a density of 50-3,000 per 100 cm$^2$ thereof; and an organic component included inside of the needled holes of the inorganic fiber mat, wherein the holding and sealing mat material generates a surface pressure of 5-500 kPa when heated to 300-1,000° C. under a filling bulk density of 0.15-0.45 g/cm$^3$, wherein said organic component is over 0 and not more than 2 weight % after being heated to 800-1,000° C.

18. A holding and sealing mat material as claimed in claim 17, wherein the inorganic fiber mat comprises inorganic fiber containing at least alumina or silica.

19. A catalytic converter as claimed in claim 1, wherein the organic component comprises an organic binder included throughout the holding and sealing mat material.

20. A catalytic converter as claimed in claim 1, wherein the needled holes were soaked with said organic component after the needle punching.

\* \* \* \* \*

UNITED STATES PATENT AND TRADEMARK OFFICE
CERTIFICATE OF CORRECTION

| | |
|---|---|
| PATENT NO. | : 7,572,415 B2 |
| APPLICATION NO. | : 10/221788 |
| DATED | : August 11, 2009 |
| INVENTOR(S) | : Koji Fukushima |

It is certified that error appears in the above-identified patent and that said Letters Patent is hereby corrected as shown below:

Column 13, line 5, after the word "filter," insert --system--;

Column 13, line 10, after the word "mat," insert --material--;

Column 13, line 16, change "needle hole" to --needled holes--.

Signed and Sealed this

Eighth Day of June, 2010

David J. Kappos
*Director of the United States Patent and Trademark Office*